Oct. 13, 1931.  L. G. HAASE  1,827,230
WATER METER
Filed Dec. 15, 1927   2 Sheets-Sheet 1
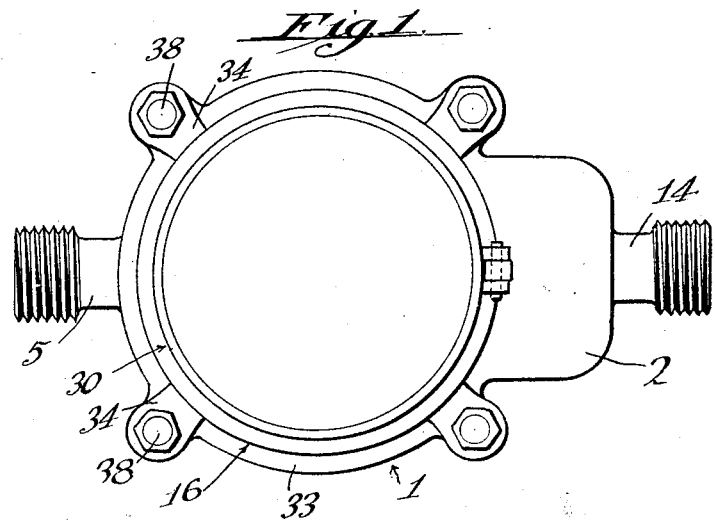
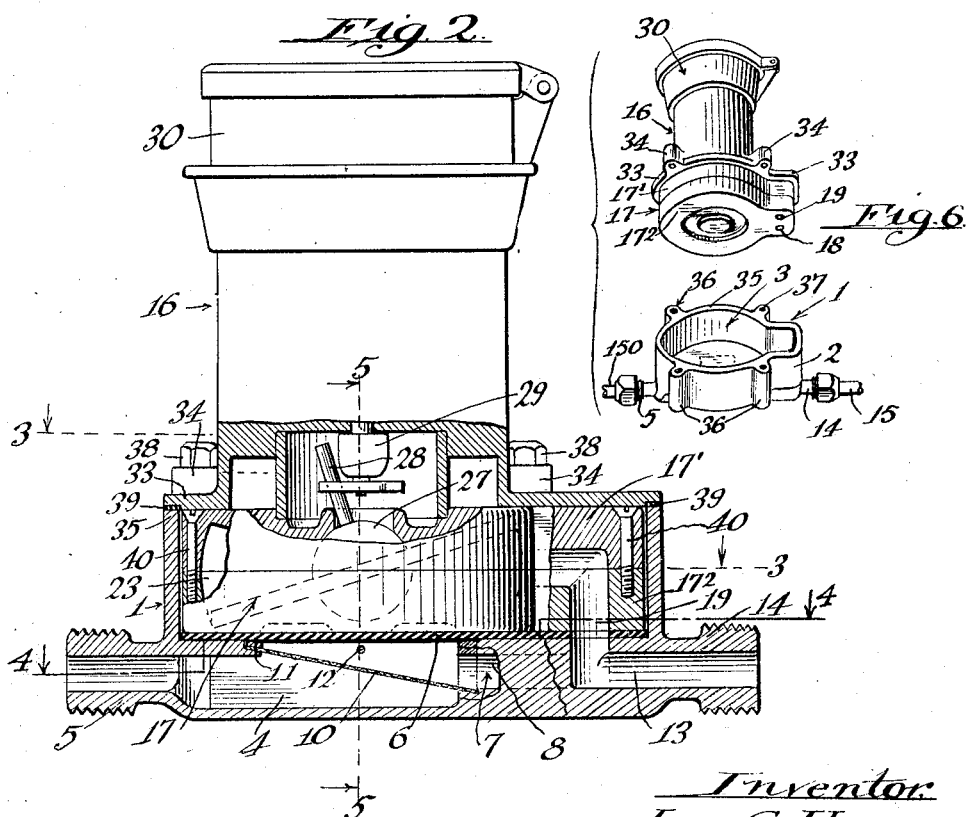
Inventor
Leo G. Haase
by Hazard and Miller
Attorneys Oct. 13, 1931.  L. G. HAASE  1,827,230
WATER METER
Filed Dec. 15, 1927  2 Sheets-Sheet 2
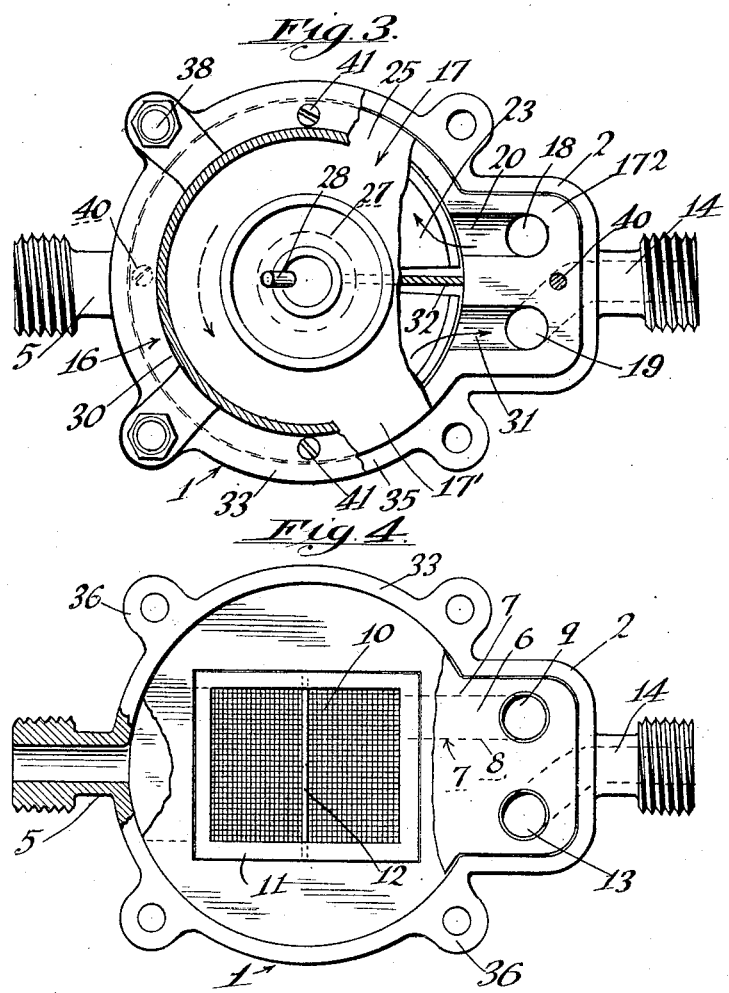
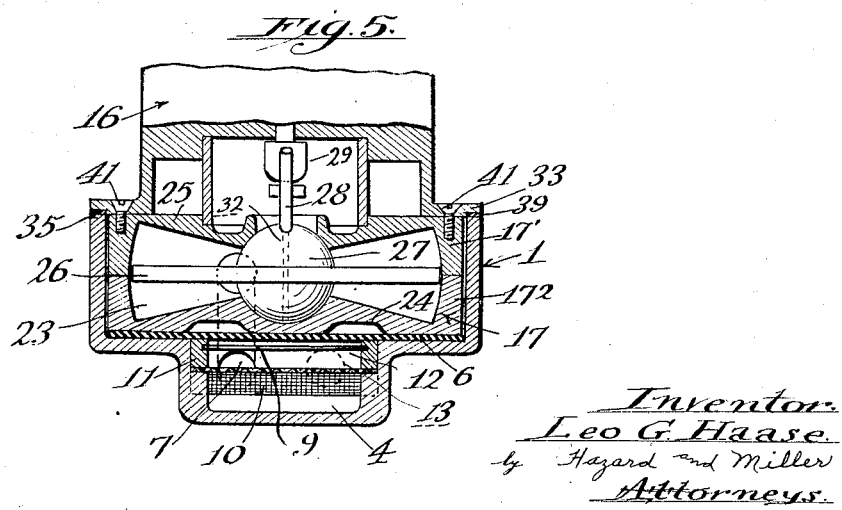
Inventor
Leo G. Haase
by Hazard and Miller
Attorneys.

Patented Oct. 13, 1931

1,827,230

UNITED STATES PATENT OFFICE

LEO G. HAASE, OF LONG BEACH, CALIFORNIA

WATER METER

Application filed December 15, 1927. Serial No. 240,180.

My invention relates to a water meter and has for its object to provide a simplified construction of the same which minimizes the labor and trouble of repair or replacement.

In the type of water meter most commonly used a casing is provided which has screw nipples at opposite ends whereby the same is connected to the service pipe and the consumption pipe, respectively. The measuring chamber in the casing with its train of gears and the registering device are installed in the casing in such a manner that in order to replace them, it is necessary to remove the entire water meter, disconnecting the nipples mentioned from the service and consumption pipes, respectively, and replace the same with one in proper working order. Such replacement is difficult because it requires the operator to get down on his hands and knees in order to make the nipple connection to the pipes which are often out of alinement due to the settling of the ground and other causes. It requires both of the hands of the operator to make the proper connections in springing the pipes in place and screwing on the unions.

The present invention provides a water meter in which the casing remains permanently attached to the service and consumption pipes. In case of repairs it is merely necessary to loosen a few bolts whereby the measuring mechanism and the registering mechanism may be removed as a unitary structure and another one substituted therefor in an exceedingly short time. The parts are so constructed that ground metal joints are unnecessary and yet fluid tight joints are provided, causing the water to pass without leakage through the measuring chamber.

With the above and other objects in view, my invention consists of the construction and arrangement of parts hereinafter described and claimed.

In the accompanying drawings I have illustrated an embodiment of my invention, in which Figure 1 is a top plan view of my improved water meter.

Fig. 2 is a side elevation thereof, the lower parts being broken away, and parts being in section to better illustrate my invention.

Fig. 3 is a compound horizontal section taken on lines 3—3 of Fig. 2.

Fig. 4 is a compound horizontal section on lines 4—4 of Fig. 2.

Fig. 5 is a vertical section taken on line 5—5 of Fig. 2, and

Fig. 6 is a perspective view showing the meter casing with the measuring and registering device removed therefrom as a unitary structure.

Referring to the drawings, 1 indicates a meter casing which is box-like in structure, open at the top, approximately circular in shape and provided with an extension 2. The upper portion of the casing 1 provides a chamber 3 for the reception of the measuring device. The lower part of the casing contains a smaller water supply chamber 4 in communication with a screw nipple 5 adapted for connection with a service pipe 150 and which constitutes the inlet port. The water supply chamber 4 is in communication with the chamber 3 immediately above but is separated therefrom by means of a gasket 6. Leading from the water supply chamber is a conduit 7 having a horizontal portion 8 and a vertical portion 9 entering the chamber 3. A removable screen extends diagonally across the water supply chamber 4 and serves to prevent any sand or shale from passing into the measuring chamber. The screen 10 is attached to a frame 11 which is provided with a transverse rod 12 whereby the screen may be removed from the supply chamber 4. Adjacent the conduit 7 is a water outlet conduit 13 leading from the chamber 3 to an outlet screw-threaded nipple 14 which is adapted for attachment to a consumption pipe 15.

The measuring and registering device is shown as a unity at 16 and consists of a housing 17 in the lower part thereof which loosely fits the chamber 3 in casing 1. At the lower face of the housing 17 there are two ports 18, and 19, which register with the inlet and outlet ports 9 and 13, respectively, in the casing 1. The inlet port 18 communicates by means of conduit 20 with the measuring chamber 23 within the housing 17. The particular measuring device or registering device is no part of my invention and it is therefore only necessary to particularly describe the parts shown, although it will be understood that any other suitable or preferred construction may be substituted therefor.

The measuring chamber 23 has the bottom 24 and the top 25 dished inwardly; and an oscillating disc 26 mounted on a ball 27 is caused to oscillate as the water entering the chamber 23 through conduit 20 passes through the chamber 23 in a circular direction. The water will cause the disc 26 to oscillate which in turn communicates this motion to a stem 28 mounted on the ball 27, which stem, through a system of gears, indicated as a whole at 29, will operate the registering device contained in the register housing 30. The water from the measuring chamber 23 passes through a conduit 31 leading to the outlet port 19, thence through the outlet conduit 13 to the nipple 14. A partition 32 in the measuring chamber 23 causes the water entering the measuring chamber to pass in a circular motion as indicated by the arrows to the outlet conduit 31.

At the junction of the housing 17 and the casing 30 I provide a flange 33 with apertured lugs 34, which flange 33 fits upon the rim 35 of casing 1, the casing 1 being provided with corresponding lugs 36, which are screw-threaded at 37 for the reception of screws 38 passing through the apertured lugs 34. A gasket 39 between the rim 35 and flange 33 provides a water-tight joint.

The housing 17 is preferably made of an upper and lower section 17' and 17² held together by screws 40 while screws 41 secure the housing 17 to the casing 30.

The operation is as follows:

Water entering the water supply chamber 4 through inlet nipple 5 after passing through screen 10 will flow through conduits 7 and 9 through the measuring device in measuring chamber 23 and out through conduits 31 and 13 through outlet nipple 14. The gasket 6, which may be of any suitable material, though copper is preferred, forms a water tight joint between the bottom of the chamber 3 and the joints of the inlet and outlet conduits. While I have shown the gasket 6 as covering the entire bottom of the chamber 3 it will be understood that it is merely necessary to make a closed water-tight joint of the connecting inlet and outlet conduits between the casing 1 and the measuring housing 17.

In case of repairs it is merely necessary to remove or loosen the bolts 38 so that the measuring chamber 17 which is connected with the registering device in casing 30 may be removed as a unitary structure, as shown in Fig. 6, and another unitary structure 16 may be substituted and quickly attached to the casing 1, the unions connecting pipes 15 and 150 connecting the outlet and inlet nipples of the casing 1, respectively, remain undisturbed.

Various changes in the details of construction may be made without departing from the spirit or scope of the invention as defined by the appended claims.

I claim:

1. A water meter construction comprising means providing an open topped casing, means providing a water inlet and a water outlet to and from the casing, both of which terminate in openings on the bottom portion of the casing, there being a water supply chamber in the water inlet having an open top exposed on the bottom of the casing, a screen frame receivable through the open top of the water supply chamber, a screen carried by the screen frame and positioned thereby in an inclined position across the water supply chamber, a measuring mechanism adapted to fit within the casing and to be detachably secured thereto, said measuring mechanism having a bottom in which there are openings adapted to be caused to register with the openings in the bottom portion of the casing, and a gasket between the bottom of the casing and the bottom of the measuring mechanism for forming a fluid tight connection therebetween, said gasket extending over the open top of the water supply chamber.

2. A water meter construction comprising a casing having an inlet and an outlet and adapted to be permanently mounted in a pipe line, said casing presenting a relatively large flat surface on which the inlet and outlet terminate in openings which are relatively small as compared with the size of the surface, a measuring mechanism presenting a surface complementary to the mentioned surface and in which an inlet and an outlet are formed and adapted to be caused to register with said openings, a gasket between the surfaces, and means for detachably fastening the measuring mechanism to said casing.

3. A water meter construction comprising a member having an inlet and an outlet and adapted to be permanently connected in a pipe line, said member presenting a relative large flat surface on which the inlet and outlet terminate in openings which are relatively small as compared with the size of the surface, a screen frame receivable through the open top into said water receiving chamber, a screen carried by the screen frame and positioned thereby in an inclined position across the water receiving chamber, a measuring mechanism presenting a surface complementary to the mentioned surface in which an inlet and outlet are formed adapted to be caused to register with said openings, a gasket between the surfaces, said gasket extending over the open top of the water receiving chamber, and means for detachably fastening the measuring mechanism to said member.

In testimony whereof I have signed my name to this specification.

LEO G. HAASE.